United States Patent
Nethken

(10) Patent No.: US 8,125,194 B2
(45) Date of Patent: Feb. 28, 2012

(54) LAPTOP COMPUTER STORAGE AND BATTERY CHARGING SYSTEMS AND METHODS INCLUDING TRANSIENT CURRENT INRUSH LIMITER

(75) Inventor: Jerry Lee Nethken, Gaston, OR (US)

(73) Assignee: Anthro Corporation, Tualatin, OR (US)

( * ) Notice: Subject to any disclaimer, the term of this patent is extended or adjusted under 35 U.S.C. 154(b) by 0 days.

(21) Appl. No.: 12/048,168

(22) Filed: Mar. 13, 2008

(65) Prior Publication Data

US 2009/0230919 A1    Sep. 17, 2009

(51) Int. Cl.
*H02J 7/00* (2006.01)
(52) U.S. Cl. ......... 320/137; 320/115; 361/58; 323/908
(58) Field of Classification Search ................ 320/115, 320/137; 361/58; 323/908
See application file for complete search history.

(56) References Cited

U.S. PATENT DOCUMENTS 5,187,653 A * 2/1993 Lorenz ........................... 363/89

(Continued)

OTHER PUBLICATIONS

XGPU2.GuideInfo—Thermistor-type—Devices—Component, http://database.ul.com/cgi-bin/XYV/template/LISEXT/1FRAME/showpage.html?&name=. . ., visited Feb. 12, 2008, 2 pages.

(Continued)

*Primary Examiner* — Edward Tso
*Assistant Examiner* — Manuel Hernandez
(74) *Attorney, Agent, or Firm* — Stoel Rives LLP

(57) ABSTRACT

A control system of a laptop computer storage system comprises a plurality of receptacles for charging one or more laptop computer batteries. A first switch may be provided for coupling the receptacles to a power source via a current limiter having an impedance that initially limits a current inrush and then decreases with temperature. A second switch may be provided for coupling the receptacles to the power source via a low impedance path. A controller may be provided and configured to activate the first switch to limit an initial current inrush while charging energy storing components associated with the laptop computer's power supply and then activate the second switch to allow each laptop coupled to the receptacles to at least partially charge its battery.

24 Claims, 6 Drawing Sheets

U.S. PATENT DOCUMENTS

| | | | | |
|---|---|---|---|---|
| 5,189,412 A | * | 2/1993 | Mehta et al. | 340/825.22 |
| 5,559,660 A | * | 9/1996 | Watson et al. | 361/58 |
| 5,576,612 A | * | 11/1996 | Garrett et al. | 320/106 |
| 5,737,160 A | * | 4/1998 | Duffy | 361/3 |
| 5,764,470 A | * | 6/1998 | Mihara et al. | 361/106 |
| 5,805,393 A | * | 9/1998 | Thomas | 361/6 |
| 6,163,469 A | * | 12/2000 | Yuki | 363/53 |
| 6,292,338 B1 | * | 9/2001 | Bernhoff et al. | 361/58 |
| 7,130,190 B1 | * | 10/2006 | Baker | 361/695 |
| 2005/0168189 A1 | * | 8/2005 | Schweigert | 320/107 |
| 2008/0247105 A1 | * | 10/2008 | Divan | 361/56 |
| 2008/0247106 A1 | * | 10/2008 | Divan | 361/58 |

OTHER PUBLICATIONS

Anthro Corporation, Laptop Storage Cart Owners Manual, Feb. 2005, 8 pages.

Anthro Corporation, Laptop Storage Cart from Anthro, 2 pages.

* cited by examiner

LAPTOP COMPUTER STORAGE AND BATTERY CHARGING SYSTEMS AND METHODS INCLUDING TRANSIENT CURRENT INRUSH LIMITER

TECHNICAL FIELD

The field of the present disclosure relates to systems, methods, and apparatus for powering up a set of power supplies used to charge one or more batteries, such as one or more laptop computer batteries.

BACKGROUND INFORMATION

Organizations, such as schools, hospitals, and businesses, may maintain centrally located banks of laptops for checkout or use in classrooms, labs, and meetings. It is desirable to have the laptops fully charged when needed. In addition, it is desirable to provide a central location to charge laptops, such as during lunch breaks. However, charging a number of laptops simultaneously presents challenges. First, each laptop computer may have an internal or external power supply that may draw several amperes during use. Thus the total number of laptops that may be charged at one time is limited by the branch circuit being used (e.g., the upstream circuit breaker/fuse and supply conductors). Furthermore, the laptops may utilize power supplies characterized by an initial current inrush.

FIG. 1 illustrates a simplified switch mode power supply 100 that may be used to supply power to a laptop computer. The power supply 100 may receive power from an AC source, such as a branch circuit supplying 120 Vac (nominal), at terminals 105. A rectifier 110 generates a DC voltage that is applied to primary windings 116 of transformer 115. A controller 120, such as a pulse width modulator, switches transistor 125 on and off (generally at a higher frequency than the AC source), thereby allowing current to flow through the primary windings 116 of the transformer 115 and a voltage to be induced at secondary windings 117. The secondary windings 117 of the transformer 115 generally step down the AC voltage, and a diode 130 generates a DC voltage that is available at terminals 135. Feedback may be provided to the controller 120 via an opto-isolator 140. A capacitor 145 may be provided to smooth the DC voltage from the rectifier 110 and prevent high-frequency waveforms from being feedback onto the AC source. In addition, a capacitor 150 may be provided after diode 130.

The power supply 100 may have a large current inrush when first plugged into the AC source. The large inrush is mostly attributable to initially charging energy storing components, such as the capacitors 145 and 150 and the windings 116 and 117 of the transformer 115. The present inventor has recognized that attaching a large number of power supplies to the AC source at one time increases the initial inrush and may actually trip the branch circuit protection (e.g., the upstream 15 or 20 ampere circuit breaker or fuse). Further, the large inrush may weld together and/or cause excessive wear of the contacts of any switches located between the branch circuit protection and the power supplies. Thus the present inventor has recognized a need for improved devices and methods to power up a set of power supplies.

DETAILED DESCRIPTION OF PREFERRED EMBODIMENTS

With reference to the above-listed drawings, this section describes particular embodiments and their detailed construction and operation. The embodiments described herein are set forth by way of illustration only. In light of the teachings herein, those skilled in the art will recognize that there may be equivalents to what is expressly or inherently taught herein. For example, variations can be made to the embodiments described herein and other embodiments are possible. It is not always practical to exhaustively catalog all possible embodiments and all possible variations of the described embodiments.

For the sake of clarity and conciseness, certain aspects of components or steps of certain embodiments are presented without undue detail when such detail would be apparent to those skilled in the art in light of the teachings herein and/or when such detail would obfuscate an understanding of more pertinent aspects of the embodiments.

FIG. 2 illustrates one example of a laptop computer storage system 200, which includes a plurality of storage bays 205. According to one embodiment, the laptop computer storage system 200 includes approximately twenty to thirty storage bays. However, additional or fewer storage bays may be provided. The storage bays 205 may be sized to accommodate a laptop computer 260 and its plug-in power supply (also known as an AC adapter). For example, the storage bays 205 may be approximately 15 to 23 inches wide, approximately 3 to 7 inches high, and approximately 12 to 20 inches deep. Of course, the storage bays 205 may be larger or smaller and may be sized to accommodate more than one laptop computer and power supply.

Figure 2A:
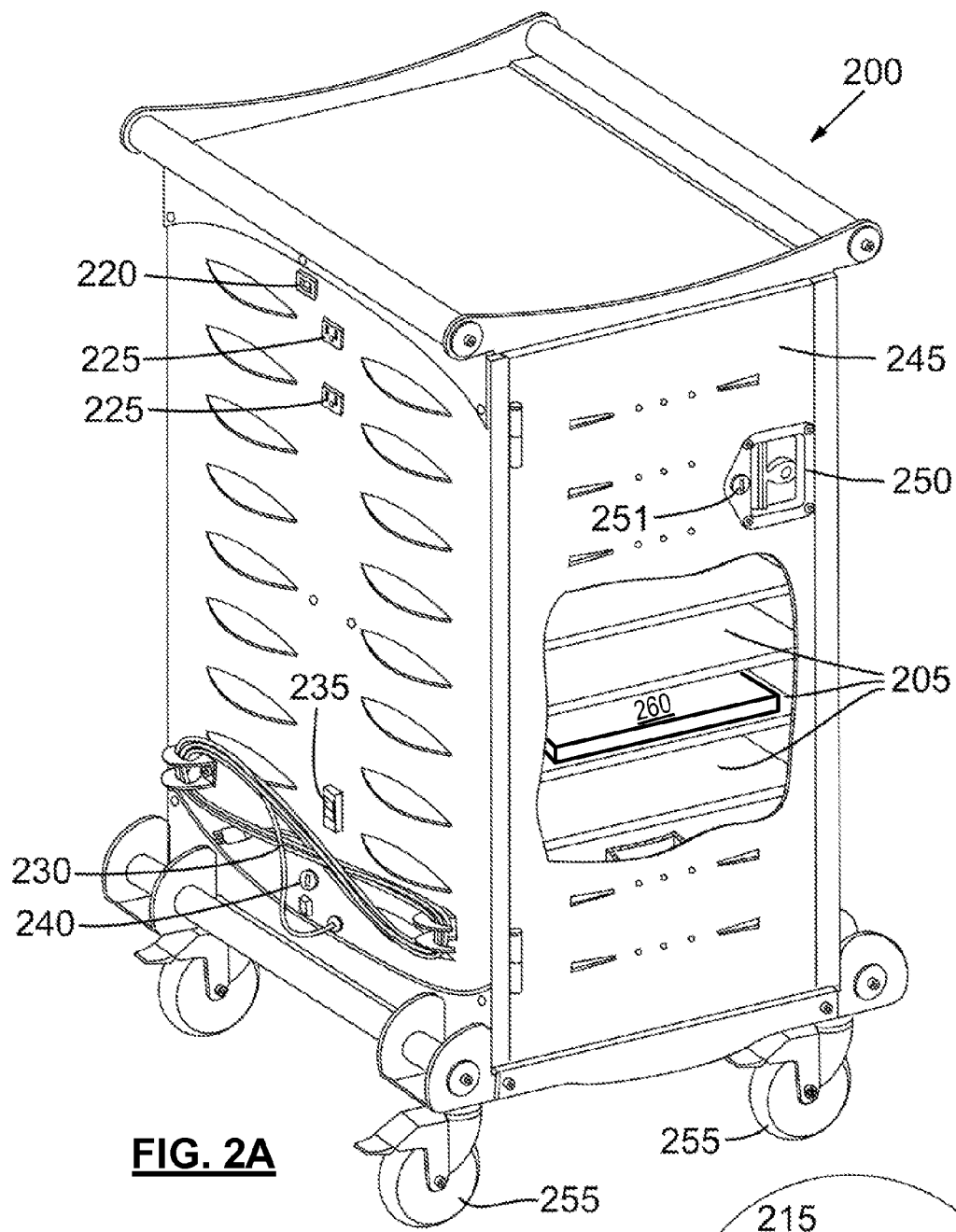
FIG. 2A illustrates a laptop computer storage system, according to one embodiment.
Figure 2B:
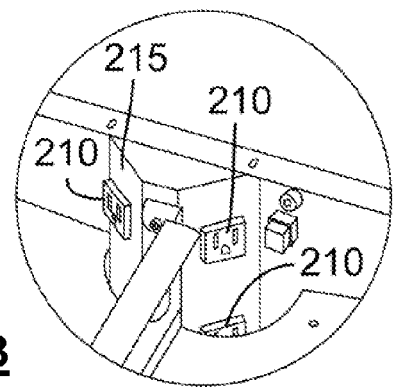
FIG. 2B is an enlarged view of an interior portion of the laptop computer storage system illustrated in FIG. 2A.

As shown in FIG. 2B, the laptop computer storage system 200 may have one or more receptacles 210 in each storage bay 205. According to one embodiment, each storage bay 205 includes a single receptacle 210 having apertures for receiving two flat parallel blades and a round grounding connection. For example, the receptacle 210 may be a 125 volt, 15 amp, 2 pole, 3 wire, grounding type receptacle in accordance with FIG. 5-15 of NEMA standards publication ANSI/NEMA WD 6-2002, entitled Wiring Devices—Dimensional Specifications, dated Aug. 29, 2002, which is hereby incorporated by reference in its entirety. However, the receptacles 210 may include any male or female contact device that is configured to supply current to an electrical device. For example, the receptacles 210 may include any of the receptacles detailed in ANSI/NEMA WD 6-2002, any receptacle suitable for installation in the U.S. or other countries, or any receptacle specifically designed to supply power to an electrical device, a battery (e.g., for charging the battery), a laptop computer, and/or a laptop computer power supply. Furthermore, the receptacles 210 may be designed to operate at different operating voltages, supply different amounts of current, and supply power using a different number of conductors.

The laptop computer storage system 200 may include one or more enclosures or raceways 215 sized to accommodate a portion of receptacles 210, conductors supplying power to the receptacles 210, and other devices. For example, a control system 300 (FIG. 3) or a portion of control system 300 may be housed within raceway 215. In addition, the laptop computer storage system 200 may include one or more network connections 220 and one or more externally accessible receptacles 225 (which may be similar or identical to the receptacles 210).

A suitable power cord 230 may be provided to connect the laptop computer storage system 200 to a branch circuit (e.g., a 120 Vac (nominal) branch circuit having a 15 or 20 ampere branch circuit protection device). In addition, the laptop computer storage system 200 may be permanently connected to an electrical power system (e.g., via conduit and associated fittings).

The laptop computer storage system 200 may include a switch 235 connected in series with the power cord 230 for selectively connecting control module 300, receptacles 210, receptacles 225, and/or other electrical devices to a branch circuit or other power source. The switch 235 may include a mechanical device used to selectively connect and disconnect a circuit, such as a toggle switch, rocker switch, circuit breaker, or surface mount switch. In addition, the switch 235 may include a semiconductor switch, such as a field effect transistor (FET), bipolar junction transistor (BJT), or other transistor or semiconductor device. A timer 240 may be provided with the laptop computer storage system 200 so that a user may specify a charge cycle. For example, as will be described in more detail with respect to FIG. 3, the laptop computer storage system 200 may supply power to a first bank of receptacles for a preselected period of time (e.g., 25 minutes) and then supply power to a second bank of receptacles for a preselected period of time (e.g., 25 minutes). The timer 240 allows the user to specify the period of time. According to one embodiment, the timer 240 may adjust the period of time from approximately one minute to approximately one hundred minutes. Of course, other time periods may be used. The timer 240 may include a potentiometer, but may include any other type of user interface, such as a keypad.

The storage bays 205 may be accessible via one or more doors 245 (e.g., one door on one side of the laptop computer storage system to access ten storage bays 205 and another door on the other side of the laptop computer storage system to access another ten storage bays 205), which may include a latch 250. The latch may include a lock 251 for securely storing the contents of the laptop computer storage system 200 (e.g., the laptops). Casters 255 may be provided to facilitate the transport of the laptop computer storage system 200.

Figure 1:
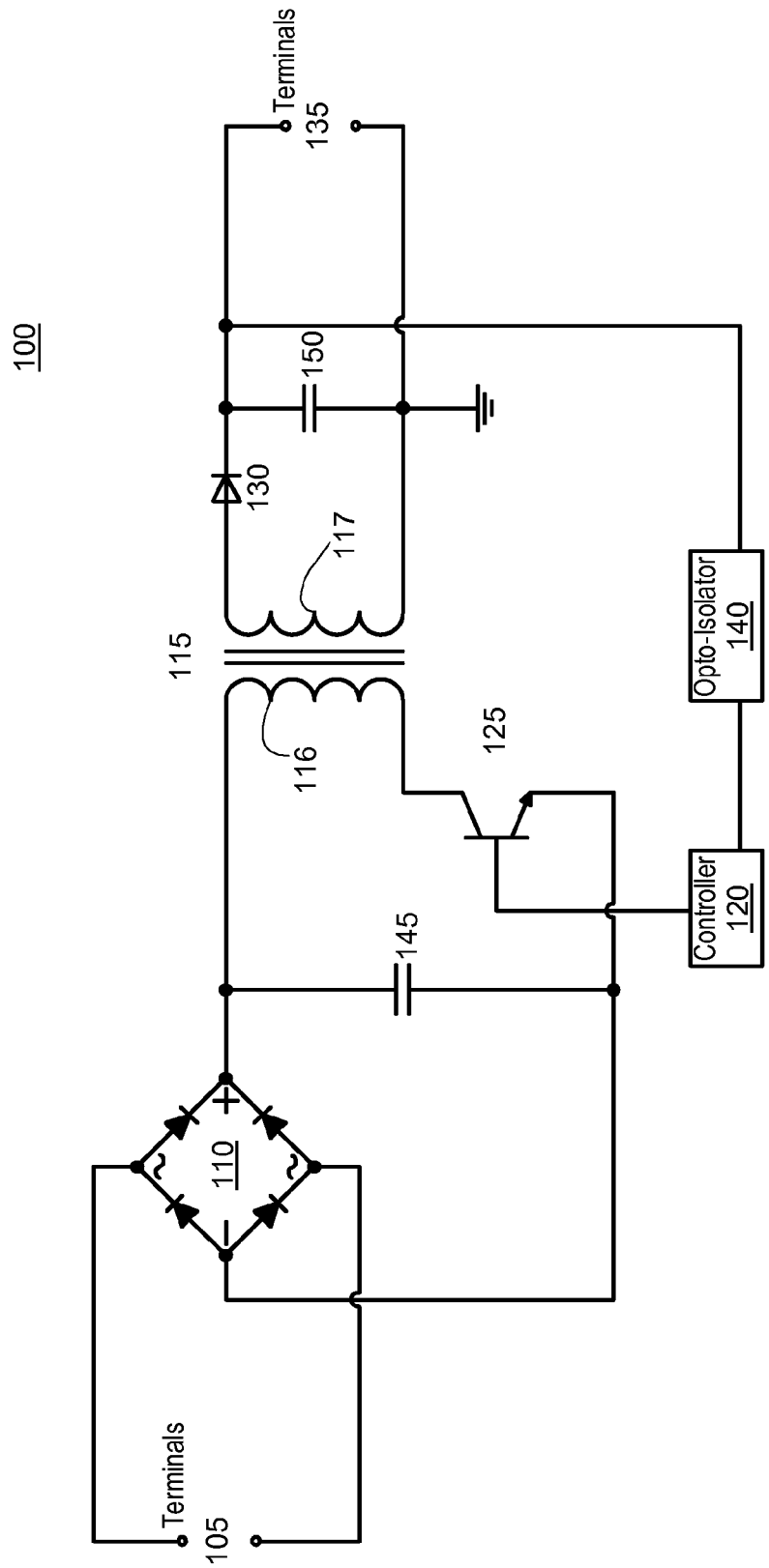
FIG. 1 is schematic of a prior art switch mode power supply.
Figure 3:
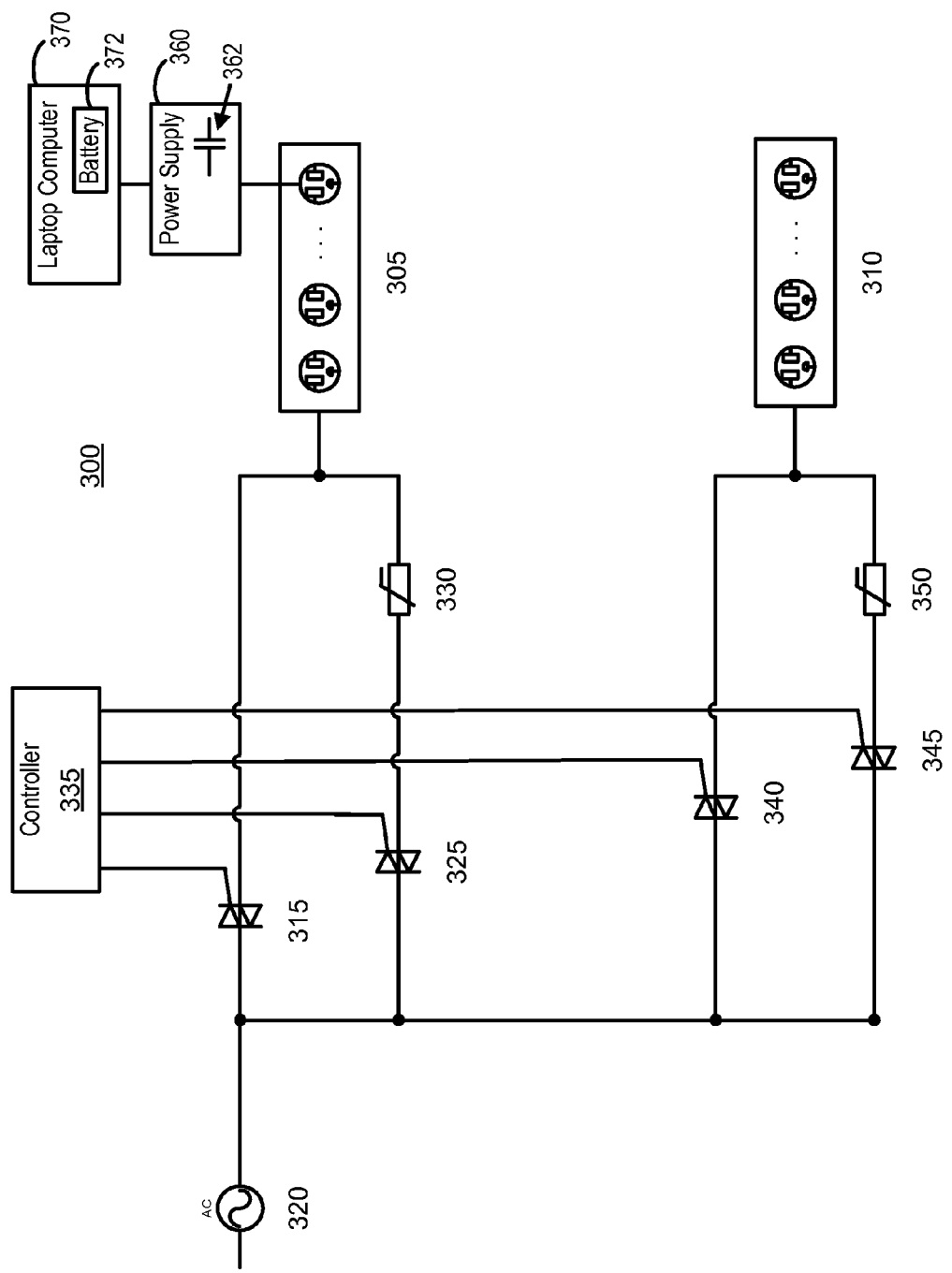
FIG. 3 is a block diagram of a control system for powering up a set of power supplies, according to one embodiment.

FIG. 3 is a block diagram of a control system 300 for powering up a set of power supplies, according to one embodiment. As shown in FIG. 3, the control system 300 includes two banks of receptacles: a first receptacle bank 305 and a second receptacle bank 310. The receptacle banks 305 and 310 may each comprise a set N (where N≧1) of receptacles. For example, the receptacle banks 305 and 310 may include one or more receptacles (e.g., receptacles 210 described with reference to FIGS. 2A and 2B) mounted through raceway 215 (FIG. 2). The receptacle banks 305 and 310 may be configured such that at least one laptop computer battery may be charged via the receptacle banks 305 and 310. For example, the receptacle banks 305 and 310 may include 125 volt, 15 amp, 2 pole, 3 wire, grounding type receptacles. A laptop computer power supply 360 (such as a power supply similar or identical to the switch mode power supply 100 illustrated in FIG. 1 that includes one or more energy storing components 362) may be plugged into one of the receptacles. In turn, the laptop computer power supply may be connected to a laptop computer 370 having installed therein one or more batteries 372. The laptop's battery charging circuit may then be used to charge the batteries.

According to another embodiment, a battery charger (not shown) or any other electrical device having a power supply may be plugged into a receptacle of one of the receptacle banks 305 and 310. The battery charger may include its own power supply (or the power supply may be external to the battery charger) and may be configured to receive a laptop computer battery (or another type of battery). Other suitable configurations for the receptacle banks 305 and 310 may be provided. For instance, the receptacle banks 305 and 310 may themselves be configured to receive a laptop computer battery (or another type of battery) and may include the appropriate charging circuitry and power supplies. Although FIG. 3 illustrates two receptacle banks 305 and 310, the control system 300 may include only one bank of receptacles or the control system 300 may include more than two banks of receptacles.

The control system 300 may include a switch 315 for selectively coupling receptacle bank 305 to a power source 320. Likewise, the control system 300 may include a switch 340 for selectively coupling receptacle bank 310 to the power source 320 (or a different power source). According to one embodiment, the power source 320 includes a branch circuit having a nominal voltage of 120 Vac and a 15 ampere overcurrent protection device (e.g., circuit breaker or fuse). However, the branch circuit may have a higher nominal voltage and may include a larger or smaller overcurrent protection device, such as a 20 ampere circuit breaker or fuse. Further, although the power source 320 may supply alternating current, the power source may also supply direct current. Other suitable power sources 320 may be provided, such as generators, alternators, solar cells, fuel cells, batteries, transformers, and switch mode power supplies.

According to one embodiment, the switch 315 and the switch 340 each comprise a triac. One suitable triac is the model BTA41-600BRG triac offered by STMicroelectronics, Geneva, Switzerland (http://www.st.com/stonline), for example. Other suitable switches 315 and 340 may be provided. A filter may be connected in parallel with switch 315 and/or switch 340. For example, an RC filter, including a 10 ohm resistor and a 0.1 microfarad capacitor, may be connected between the terminals of switch 315 and another 10 ohm resistor, and a 0.1 microfarad capacitor may be connected between the terminals of switch 340.

The control system 300 may also include a switch 325 for selectively coupling the first receptacle bank 305 to the power source 320 via a current limiter 330. Likewise, the control system 300 may also include a switch 345 for selectively coupling the second receptacle bank 310 to the power source 320 (or another power source) via a current limiter 350. Each of the switches 325 and 345 may comprise a triac. Each of the current limiters 330 and 350 may have an impedance that initially limits an initial current inrush and then decreases over time. According to one embodiment, each of the current limiters 330 and 350 comprise a thermistor having a negative temperature coefficient (NTC). In other words, as the temperature of the thermistor increases, its resistance decreases. Thus, when powered up, the current limiters 330 and 350 will tend to heat up and limit an initial current inrush. One suitable thermistor is the model SL22 5R012 thermistor offered by Ametherm, Inc. of Carson City, Nev. (http://www.ametherm-.com), for example. Other suitable current limiters 330 and 350 may be provided. For instance, the current limiter 330 and/or the current limiter 350 may comprise thermocouples along with associated control circuitry, semiconductor analog sensors, and digital temperature sensors. According to one embodiment, two thermistors are connected in series with the switch 325 and two thermistors are connected in series with the switch 345. However, additional or fewer thermistors may be used.

Alternatively, one or more of the switches 315, 325, 340, and 345 may comprise a type of switch other than a triac, such as a thyristor, diode for alternating current (DIAC), semiconductor-controlled rectifier (SCR), insulated-gate bipolar transistor (IGBT), any other semiconductor switch (e.g., FETs, BJTs, etc.), or any switch suitable for AC switching. In addition, switches 315, 325, 340, and 345 may include a mechanical type switch, such as a relay or contactor.

As FIG. 3 illustrates, the switch 315 is connected in parallel with the switch 325 and the current limiter 330. Likewise, the switch 340 is connected in parallel with the switch 345 and the current limiter 350. Thus when the switch 315 is turned on, a low impedance path is provided from the power source 320 to the receptacle bank 305 that has an impedance less than an initial impedance of the current limiter 330 immediately prior to an initial current inrush. In other words, the switch 315 provides another path that has a lower impedance than the path through the current limiter 330 (at least when the current limiter 330 provides some resistance). Likewise, when the switch 340 is turned on, a low impedance path is provided from the power source 320 to the receptacle bank 310 that has an impedance less than an initial impedance of the current limiter 350 immediately prior to an initial current inrush.

As will be described in more detail with respect to FIG. 5, the receptacle bank 305 may be coupled to the power source 320 via the current limiter 330 by activating the switch 325. Then power may be supplied to the receptacle bank 305 via the switch 315. Cycling the power in such a manner allows the control system 300 to limit an initial current inrush and then allows the current limiter 330 to approach the ambient temperature (thus returning the current limiter to its high resistance state). After cooling a bit, the current limiter 330 may be switched back in to again limit current inrush. A similar power cycle may occur with respect to receptacle bank 310, switch 340, switch 345, and current limiter 350.

A controller 335 may be configured to turn on and off the switches 315, 325, 340, and/or 345. The controller 335 may be any of various commercially available controllers. One suitable controller is the model ATmega88/V microcontroller offered by Atmel Corporation of San Jose, Calif. (http://www.atmel.com), for example. The controller 335 may also comprise a microprocessor, dual microprocessor, or other multiprocessor architectures. The timer 240 (FIG. 2) may be operatively coupled to the controller 335 to allow the user to adjust an amount of time each receptacle bank 305 and 310 is connected to the power source 320. For example, the controller 335 may look for differing voltages from a potentiometer. A communication interface, such as a serial port, may be provided to program and otherwise interface with the controller 335.

Figure 4:
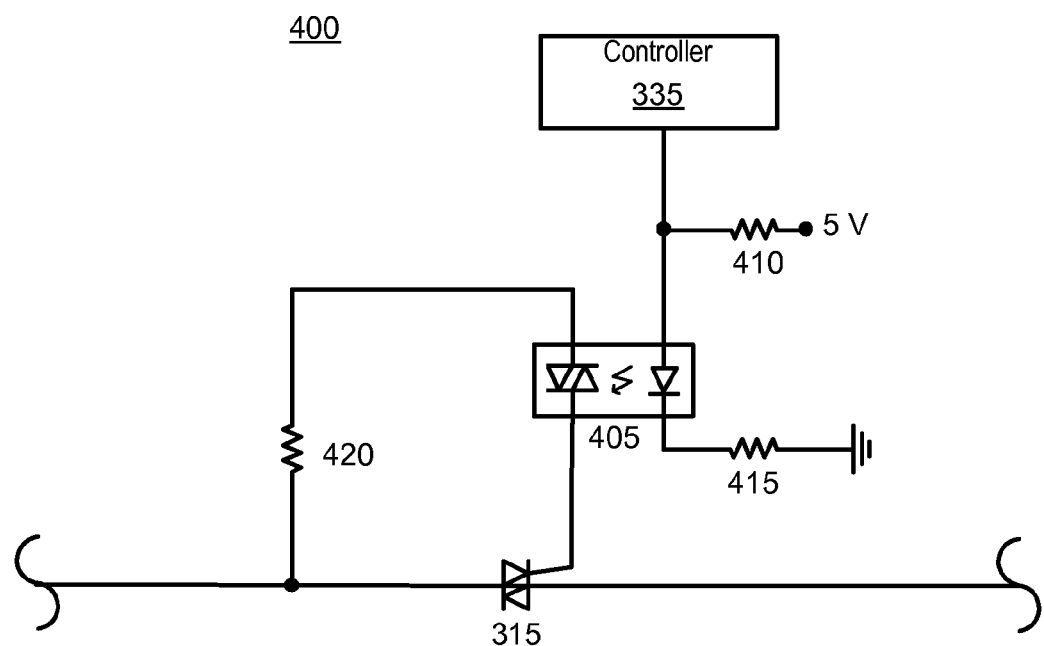
FIG. 4 is a schematic diagram of an electrical isolation circuit, according to one embodiment.

If each of the switches 315, 325, 340, and 345 comprise a triac, the controller 335 may be connected to the gates of each of the triacs. According to one embodiment, the controller 335 is electrically isolated from the switches 315, 325, 340, and 345, such as via an optical isolator. FIG. 4 illustrates an electrical isolation circuit 400, according to one embodiment. The controller 335 may be connected to the anode of a photodiode within a phototriac 405. One suitable phototriac is the model MOC3032M phototriac offered by Fairchild Semiconductor Corporation of Portland, Me. (http://www.fairchildsemi.com), for example. However, other suitable phototriacs may be provided. A pull-up resistor 410, such as a 10 kΩ resistor, may also be coupled to the anode of the photodiode. The cathode of the photodiode may be grounded through resistor 415 (e.g., a 300Ω resistor). One terminal of the triac within the phototriac 405 may be connected to the power source 320 (FIG. 3) via a resistor 420 (e.g., a 180Ω resistor). The other terminal of the triac within the phototriac 405 may be connected to the switch 315 (e.g., the gate of the triac). Of course, the isolation circuit illustrated in FIG. 4 may also be used with the other switches 325, 340, and 345. Although FIG. 4 illustrates electrical isolation according to one embodiment, electrical isolation may be provided in other ways, such as by other optical isolators, transformers, or other devices that provide galvanic isolation (e.g., via capacitance, induction, electromagnetic waves, acoustic, or mechanical means).

Although not specifically illustrated in FIG. 3, the neutral and grounding conductors (if any) associated with the power source 320 may simply be passed to the receptacle banks 305 and 310. All or some of the components associated with the control system 300 may be mounted to a printed circuit board and electrically connected via traces. The printed circuit board may have mounted thereon one or more connectors for supplying power to the control system 300 (e.g., line, neutral, and ground) and providing power to the electrical receptacles (e.g., receptacle banks 305 and 310). However, the components may be mounted and interconnected in other ways, such as being mounted to a substrate and being interconnected via electrical conductors. Thus the control system 300 may have a relatively compact form factor and may allow the control system 300 or a portion of the control system 300 to fit within raceway 215 (FIG. 2) of laptop storage system 200. For example, according to one embodiment, the printed circuit board is approximately eight inches long by approximately three and a half inches wide and has components mounted thereto rising less than approximately one inch therefrom. Of course, the printed circuit board may be larger or smaller and the components mounted thereto may have a height that is larger or smaller.

Figure 5:
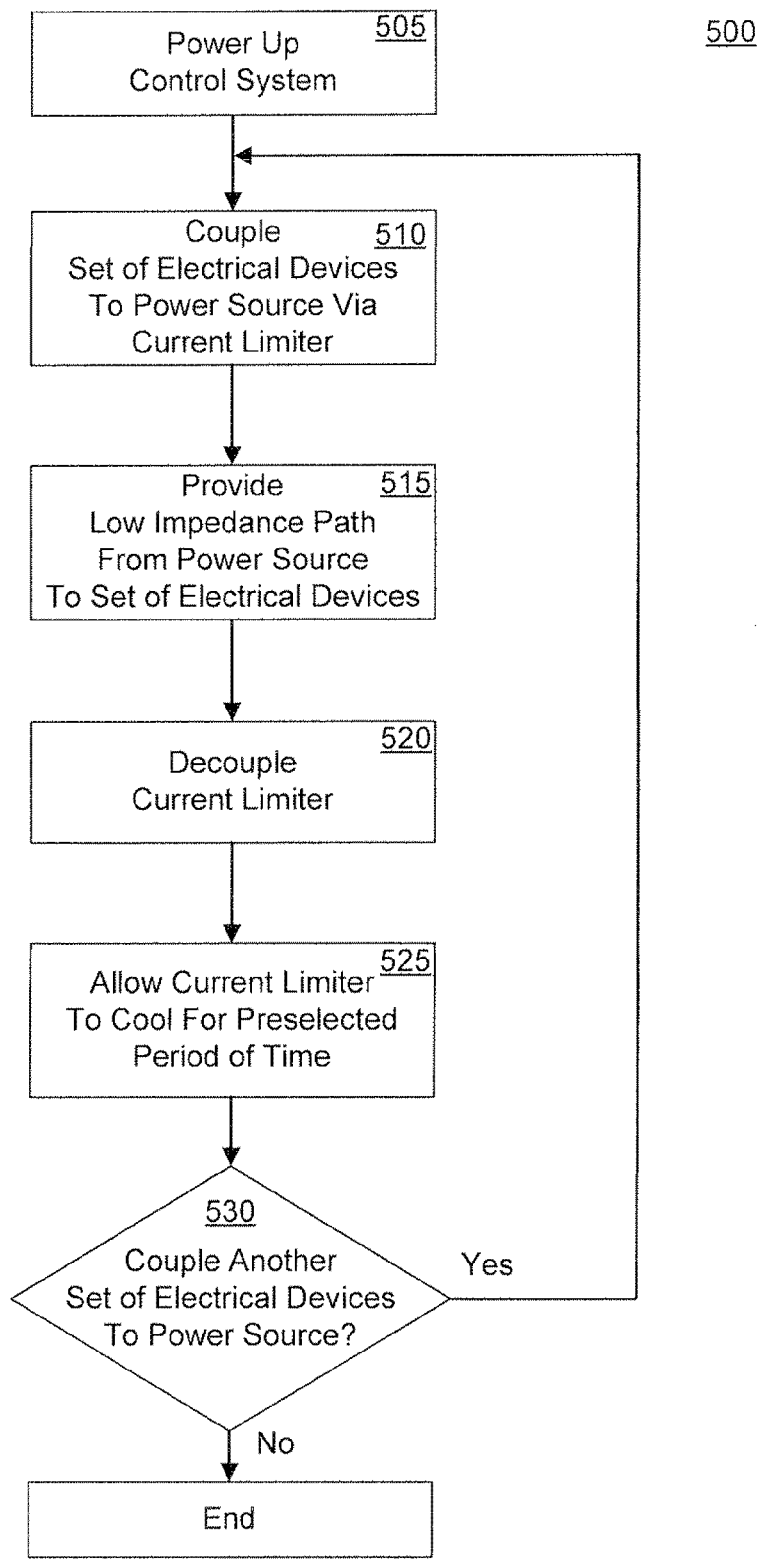
FIG. 5 is a flowchart illustrating a method of powering up a set of electrical devices, according to one embodiment.

FIG. 5 is a flowchart illustrating a method 500 of powering up a set of electrical devices, according to one embodiment. Initially, the user may adjust the switch 235 (FIG. 2) to the off position. In the case of a single pole center off switch (e.g., one terminal supplying power to the external receptacles 225 and the other terminal supplying power to the internal receptacles 210), the user may adjust the switch to the center position, thereby disconnecting both the external receptacles 225 and the internal receptacles 210. Next, the user may plug the power cord 230 into a receptacle connected to a suitable branch circuit (e.g., a 120 Vac (nominal) branch circuit having a 15 or 20 ampere branch circuit protection device). After opening the door 245 (e.g., via latch 250), the user may load a set of N (where N≧1) electrical devices, such as laptops, into the laptop computer storage system 200 (e.g., one laptop computer per storage bay 205) and then plug the set into available receptacles 210. If desired, the user may specify a charge cycle via timer 240.

At step 505, method 500 powers up the control system 300. For example, the user may adjust the switch 235 to a downward position so that power may be supplied to the internal receptacles 210. According to one embodiment, the control system 300 does not supply power to receptacle banks 305 or 310 for a period of time. This may allow any power fluctuations to settle and avoid any unnecessary heating of the current limiters 330 or 350 (e.g., such as power fluctuations that may be caused by quickly cycling the switch 235).

The method 500 couples a set of electrical devices (e.g., electrical devices that include a battery, such as a laptop computer 370) to a power source via a current limiter at step 510. For example, the controller 335 may turn on switch 325 so that the power source 320 may supply power to the receptacle bank 305 via the current limiter 330. According to one embodiment, power is supplied to the receptacle bank 305 for a period of time sufficient to at least partially charge one or more energy storing components associated with the set of electrical devices. For example, a power supply, such as a switch mode power supply similar or identical to that described with reference to FIG. 1, may be plugged into one of the receptacles 210. In turn, the power supply may be coupled to an electrical device including one or more batteries. Coupling the power supply to the power source 320 via the current limiter 330 may allow for the capacitors, inductors, and/or other components that cause a current inrush to reach a steady state condition (e.g., charge or at least partially charge) with little or no initial current inrush. In other words, the current limiter 330 allows the energy storing components to be charged (or at least partially charged) but prevents the energy storing components from drawing the initial current they otherwise would (but for the current limiter 330).

At step 515, the method 500 provides a low impedance path from the power source to the set of electrical devices. For example, the controller 335 may turn on switch 315 so that the power source 320 may supply power to the receptacle bank 305 independently of the current limiter 330. Once switch 315 is on, there should be little or no impedance from the power source 320 to the receptacle bank 305. According to one embodiment, both the switch 315 and the switch 325 will be on for a period of time.

The method 500 may decouple the current limiter at step 520. For example, the controller 335 may turn off switch 325 so that power is supplied to the receptacle bank 305 only via switch 315. Decoupling the current limiter helps ensure that the current limiter is allowed to approach its initial impedance. At step 525, the method 500 allows the current limiter to cool for a preselected period of time. For example, after decoupling the current limiter, the current limiter is allowed to cool while each electrical device (e.g., laptop computers including one or more batteries) coupled to the power source at least partially charges its battery. The amount of cooling will, of course, depend on several factors, such as the ambient temperature, the preselected period of time, and the heat dissipation properties of the current limiter. According to one embodiment, the current limiter 330 cools approximately to an ambient temperature. After the preselected period of time, the controller 335 may turn switch 315 off.

At step 530, the method 500 determines whether to couple another set of electrical devices to the power source. For example, if there is another bank of receptacles, such as receptacle bank 310, the method 500 may repeat steps 510, 515, 520, and 525 using switch 340, switch 3456 and current limiter 350. Thus another set of batteries may be charged for a preselected period of time. According to one embodiment, there is a delay before the other set of electrical devices are coupled to the power source. Although the method 500 may couple two sets of electrical devices to the power source, the method 500 may only couple one set of electrical devices to the power source or may couple more than two sets of electrical devices to the power source. In addition, although the method 500 may determine whether to couple another set of electrical devices to the power source, the method 500 may simply automatically switch to another set of electrical devices. For example, the method 500 may charge a first set of laptop batteries and then charge a second set of laptop batteries. After charging the second set of laptop batteries, the method 500 may repeat, serially charging the first and second sets of laptop batteries.

Many variations of the method 500 or its steps are possible. For example, after coupling one set of electrical devices to the power source, the energy storing components may still be charged (e.g., the capacitors in the power supplies). Thus there may be no need to couple the set of electrical devices to the power source via a current limiter. Instead, the set of electrical devices may be coupled to the power source via a low impedance path.

Figure 6:
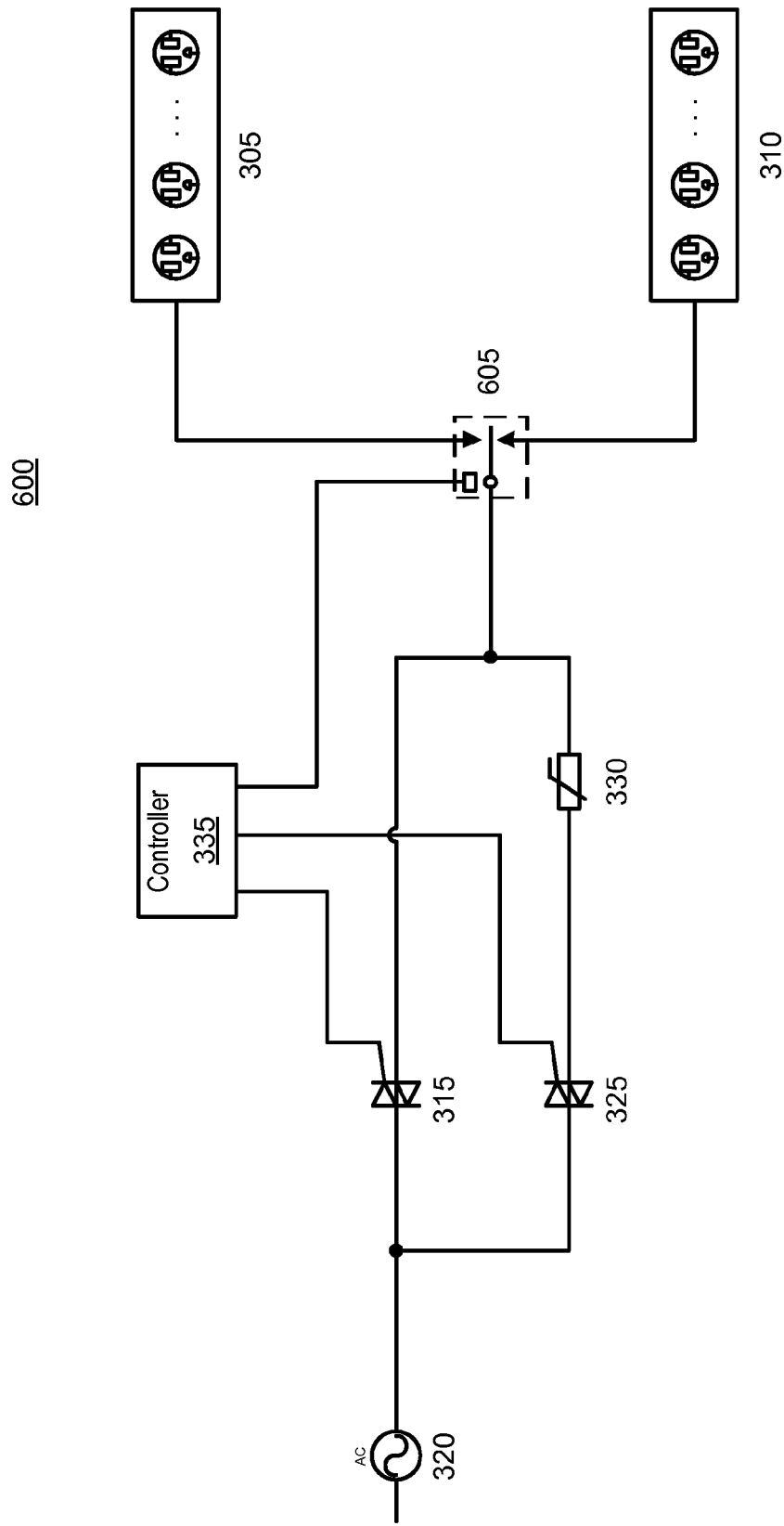
FIG. 6 is a block diagram of a control system for powering up a set of power supplies, according to another embodiment.

Further, the method 500 may couple another set of electrical devices to the power source by repeating steps 510, 515, 520, and 525 again using switch 315, switch 325, and current limiter 330. For example, as shown In FIG. 6, the controller 335 may control another switch 605 (e.g., a relay) to switch between receptacle banks 305 and 310. According to one embodiment, the switch 605 comprises a relay. However, other suitable switches 605 may be provided. For instance, switch 605 may comprise a contactor. In addition, switch 605 may comprise a semiconductor switch, such as a triac, thyristor, DIAC, SCR, IGBT, any other semiconductor switch (e.g., FETs, BJTs, etc.), or any other switch suitable for AC switching. The controller 335 may configure the switch 605 so that receptacle bank 305 is coupled to the power source 320 via switch 315, switch 325, and current limiter 330 as previously described. The controller may then configure the switch 605 so that receptacle bank 310 is coupled to the power source 320 via switch 315, switch 325, and current limiter 330 as previously described.

The methods and systems described herein may be implemented in and/or by any suitable hardware, software, firmware, or combination thereof. Accordingly, as used herein, a component or module may comprise hardware, software, and/or firmware (e.g., self-contained hardware or software components that interact with a larger system). Embodiments may include various steps, which may be embodied in machine-executable instructions to be executed by the controller 335 or another processor. Thus, embodiments may be provided as a computer program product including a machine-readable storage medium having stored thereon instructions (in compressed or uncompressed form) that may be used to program a computer (or other electronic device) to perform processes or methods described herein. In addition, the steps may be performed by hardware components that include specific logic for performing the steps or by a combination of hardware, software, and/or firmware. A result or output from any step, such as a confirmation that the step has or has not been completed or an output value from the step, may be stored (in a memory (not shown)), displayed (on a display (not shown)), printed (on a printing device (not shown)), and/or transmitted over a wired or wireless network (via a network interface (not shown)). For example, an indication that the set of laptop batteries have been charged for the preselected period of time may be stored, displayed, or transmitted over a network.

Although various embodiments described herein have discussed powering up a set of power supplies used to charge one or more laptop computer batteries, it should be recognized that the systems and methods disclosed herein are equally applicable to powering up a set of power supplies used to supply power to any electrical device. For example, the systems and methods disclosed herein may be used to power up a set of power supplies for charging other types of batteries, such as cell phone batteries and camera batteries. In particular, as used herein, battery refers to any device including one or more electrochemical cells that chemically stores energy and makes the energy available in electrical form. Thus batteries charged via the systems and methods disclosed herein may include disposable type batteries (such as alkaline batteries, silver-oxide batteries, lithium iron disulphide batteries) and rechargeable type batteries (such as nickel-cadmium batteries, nickel-metal hydride batteries, and rechargeable alkaline batteries). Furthermore, it should be recognized that the systems and methods disclosed herein may also be used to supply power to other types of circuits characterized by an initial current inrush.

Thus, as should be appreciated in view of the teachings herein, certain embodiments may be capable of achieving certain advantages, including by way of example and not limitation one or more of the following: (1) providing a system for securely storing, transporting, and charging a set of laptops; (2) providing the ability to charge a set of laptops simultaneously; (3) providing the ability to limit an initial current inrush when charging a set of laptops simultaneously; (4) providing the ability to charge a number of laptops simultaneously without tripping an upstream branch circuit protection device; (5) providing the ability to charge a number of laptops simultaneously without welding together the contacts of switches located between the branch circuit protection and the laptops; (6) providing a system that initially offers a high impedance to limit a current inrush; (7) providing a system that decouples a current limiter to allow the current limiter to cool; (8) providing a cost-effective system having a relatively compact form factor for charging a set of laptops; and (9) providing the ability to power up a set of power supplies simultaneously.

The terms and descriptions used herein are set forth by way of illustration only and are not meant as limitations. Those skilled in the art will recognize that many variations can be made to the details of the above-described embodiments without departing from the underlying principles of the invention. The scope of the invention should therefore be determined only by the following claims (and their equivalents) in which all terms are to be understood in their broadest reasonable sense unless otherwise indicated.

The invention claimed is:

1. A method of charging a plurality of electrical devices by coupling them to a power source selectively through interruptible current limiting and low impedance electrical circuit paths, each electrical device including a battery coupled to a power supply, the current limiting circuit path including a series-connected first switch and current limiter, and the low impedance circuit path including a second switch, and the current limiter characterized by a state of thermally sensitive high impedance that decreases to a state of lower impedance with an increase in temperature of the current limiter, the method comprising:

providing a first control signal to which the first switch responds by selectively allowing and interrupting current flow through the current limiting circuit path; and providing a second control signal to which the second switch responds by selectively allowing and interrupting current flow through the low impedance circuit path, the first and second control signals provided in cooperative first and second switching states to the first and second switches, the first and second switching states operating during respective first and second time periods that at most partly overlap each other and have preselected durations, and the first time period starting before and being shorter in duration than the second time period, the first and second control signals in the first cooperative switching state causing, during the first time period, current flow through the current limiting circuit path and thereby through the current limiter in the high impedance state to couple the power source and the plurality of electrical devices and to prevent a transient inrush of current to the plurality of electrical devices, and the first and second control signals in the second cooperative switching state causing, during the second time period, current flow through the low impedance circuit path to couple the power source and the plurality of electrical devices to charge the batteries coupled to the electrical devices and to decouple the current limiter by interrupting current flow through the current limiting circuit path to allow the current limiter to assume ambient temperature and thereby attain the characteristic high impedance so that current may again be caused to flow through the current limiting circuit path while the current limiter is in the high impedance state.

2. The method of claim 1, wherein the second time period is substantially longer in duration than the first time period.

3. The method of claim 1, wherein the current flow through the current limiting circuit path is continuous and uninterrupted during the first time period.

4. The method of claim 1, wherein the power supply comprises a plug-in laptop computer power supply that includes an energy storing component, and wherein the duration of the first time period is preselected such that current flows through the current limiting path for an uninterrupted period of time that is sufficient to substantially fully charge the energy storing component.

5. The method of claim 1, wherein the power source comprises an AC power source and the electrical devices are configured to operate using the AC power source.

6. The method of claim 1, wherein the current limiting circuit path is effective to prevent a transient inrush of current when an arbitrary number of electrical devices that draw an arbitrary combined current are coupled to the power source.

7. The method of claim 1, wherein the first and second control signals in the first cooperative switching state cause, during the first time period, current to flow through the current limiting circuit path irrespective of whether there is a transient inrush of current.

8. The method of claim 1, wherein the plurality of electrical devices comprise a first plurality of electrical devices, and further comprising:

after the first plurality of electrical devices have been coupled to the power source to charge the batteries coupled to the first plurality of electrical devices, selectively coupling to the power source a second plurality of electrical devices by providing respective third and fourth control signals in cooperative third and fourth switching states to third and fourth switches included in respective second interruptible current limiting and low impedance electrical circuit paths, wherein the third and fourth switching states operate during respective third and fourth time periods that at most partly overlap each other, wherein the third and fourth time periods have preselected durations, and wherein the third time period starts before and is shorter in duration than the fourth time period.

9. The method of claim 1, wherein the first current limiter comprises a thermistor having a negative temperature coefficient.

10. The method of claim 1, wherein the first and second switches comprise triacs.

11. The method of claim 1, further comprising:

after the current limiter attains the characteristic high impedance, causing, during a third preselected time period, current flow through the current limiting circuit path and thereby through the current limiter in the high impedance state to couple the power source and the plurality of electrical devices and to prevent a transient inrush of current to the plurality of electrical devices.

12. A control system for charging different sets of multiple laptop computer batteries, comprising:

first and second sets of multiple electrical receptacles, the electrical receptacles in each of the first and second sets configured to be coupled to power supplies, each of the power supplies configured to be coupled to a laptop computer including a battery, and each of the power supplies including one or more energy storing components;

a pair of interruptible current limiting and low impedance electrical circuit paths coupling a power source to different ones of the first and second sets of multiple electrical receptacles, the interruptible current limiting electrical circuit path of each one of the pair including a series-connected first switch and current limiter, the first switch responsive to a first control signal to selectively allow and interrupt current flow through the current limiting circuit path, and the current limiter characterized by a state of thermally sensitive high impedance that decreases to a state of lower impedance with an increase in temperature of the current limiter, and the interruptible low impedance electrical circuit path of each one of the pair including a second switch responsive to a second control signal to selectively allow and interrupt current flow through the low impedance circuit path; and a controller operatively coupled and providing to the first and second switches, to which a selected one of the first and second sets of multiple electrical receptacles are coupled, the first and second control signals in cooperative first and second switching states, the first and second switching states operating during respective first and second time periods which at most partly overlap each other and have preselected durations, and in which the first time period starts before and is shorter than the second time period, and, for the selected one of the first and second sets of the multiple electrical receptacles, the first and second control signals in the first cooperative switching state causing, during the first time period, current flow through the current limiting circuit path and thereby through the current limiter in the high impedance state to couple the power source and the power supplies and to prevent a transient inrush of current to the power supplies, and the first and second control signals in the second cooperative switching state causing, during the second time period, current flow through the low impedance circuit path to couple the power source and the power supplies to charge the batteries coupled to the power supplies and to decouple the current limiter by interrupting current flow through the current limiting circuit path to allow the current limiter to assume ambient temperature and thereby attain the characteristic high impedance so that current may again be caused to flow through the current limiting circuit path while the current limiter is in the high impedance state.

13. The control system of claim 12, wherein the second preselected time period is substantially longer in duration than the first preselected time period.

14. The control system of claim 12, wherein the controller is configured to cause current to flow through the current limiting circuit path in a continuous and uninterrupted manner during the first time period.

15. The control system of claim 12, wherein the power supplies comprise plug-in laptop computer power supplies, and wherein the duration of the first time period is preselected such that current flows through the current limiting path for an uninterrupted period of time that is sufficient to substantially fully charge the one or more energy storing components.

16. The control system of claim 12, wherein the power source comprises an AC power source and the power supplies are configured to operate using the AC power source.

17. The control system of claim 12, wherein the power source comprises an AC power source and the pair of interruptible current limiting and low impedance electrical circuit paths are configured to couple a selected one of the first and second sets of multiple electrical receptacles to the AC power source such that AC voltage is applied to the electrical receptacles.

18. The control system of claim 12, wherein the current limiting circuit path is effective to prevent a transient inrush of current when an arbitrary number of power supplies that draw an arbitrary combined current are coupled to the power source.

19. The control system of claim 12, wherein the first and second control signals in the first cooperative switching state cause, during the first time period, current to flow through the current limiting circuit path irrespective of whether there is a transient inrush of current.

20. The control system of claim 12, wherein the first current limiter comprises a thermistor having a negative temperature coefficient.

21. The control system of claim 12, wherein the first and second switches comprise triacs.

22. The control system of claim 12, wherein the one or more energy storing components comprise capacitors associated with switch mode power supplies.

23. The control system of claim 12, wherein each of the first and second sets of multiple electrical receptacles includes an arbitrary number of electrical receptacles.

24. The control system of claim 12, wherein power is provided to the controller for a third preselected period of time before the pair of interruptible current limiting and low impedance electrical circuit paths couple the power source to different ones of the first and second sets of multiple electrical receptacles.

* * * * *